(12) United States Patent
Fu et al.

(10) Patent No.: US 9,728,063 B1
(45) Date of Patent: Aug. 8, 2017

(54) ENVIRONMENTAL MONITORING PIPELINE CLOSURE AND WIRELESS POSITIONING AND WARNING SYSTEM THEREOF

(71) Applicants: Jui-Chi Fu, Taipei (TW); Nien-Chi Hung, Taichung (TW)

(72) Inventors: Jui-Chi Fu, Taipei (TW); Nien-Chi Hung, Taichung (TW)

( * ) Notice: Subject to any disclaimer, the term of this patent is extended or adjusted under 35 U.S.C. 154(b) by 0 days.

(21) Appl. No.: 15/016,842

(22) Filed: Feb. 5, 2016

(51) Int. Cl.
*G08B 21/00* (2006.01)
*G08B 21/12* (2006.01)
*G08B 25/10* (2006.01)

(52) U.S. Cl.
CPC ............. *G08B 21/12* (2013.01); *G08B 25/10* (2013.01)

(58) Field of Classification Search
CPC .... E02D 29/1427; G08B 13/08; G08B 21/16; G08B 21/12; G08B 25/10
USPC .................................................. 340/539.26
See application file for complete search history.

(56) References Cited

U.S. PATENT DOCUMENTS

| | | | | |
|---|---|---|---|---|
| 5,583,492 A | * | 12/1996 | Nakanishi | G08C 17/02 340/870.01 |
| 2006/0261941 A1 | * | 11/2006 | Drake | G08B 13/149 340/539.26 |
| 2007/0077125 A1 | * | 4/2007 | Kadrnoska | F16L 3/223 405/183.5 |
| 2008/0252449 A1 | * | 10/2008 | Colvero | G01S 13/74 340/540 |
| 2010/0019912 A1 | * | 1/2010 | Wander | E02D 29/1427 340/632 |
| 2012/0268290 A1 | * | 10/2012 | Huang | G01K 1/14 340/870.02 |

* cited by examiner

*Primary Examiner* — Mark Rushing
(74) *Attorney, Agent, or Firm* — Bacon & Thomas, PLLC (57) ABSTRACT

An environmental monitoring pipeline closure and a wireless positioning and warning system thereof are disclosed. The environmental monitoring pipeline closure is composed of an upper platen, an expansion body, a lower platen, a plurality of bolts, and a plurality of compression rings, on which a plurality of clamping holes are provided for holding and fixing a cable line. A gas sensing device is provided inside the pipeline closure to detect gas concentrations within the space inside a manhole channel when being installed in the underground manhole channel. The measured data is transferred to a monitoring device through wireless transmissions to keep monitoring gas concentrations within the manhole channel. This prevents injuries and deaths of people working inside the manhole channel due to a lack of oxygen or inhalation of harmful gases.

12 Claims, 7 Drawing Sheets

ENVIRONMENTAL MONITORING PIPELINE CLOSURE AND WIRELESS POSITIONING AND WARNING SYSTEM THEREOF

BACKGROUND OF THE INVENTION

Field of the Invention

The present invention relates to an environmental monitoring pipeline closure and a wireless positioning and warning system thereof, particularly to a pipeline closure which allows cable line to be mounted and fixed. Compression rings having a wedge are provided to the closure for fixedly holding the cable line. A gas sensing device is provided on the main body for detecting gas concentrations within the space of manhole channel. The detected data is transmitted to a monitoring device through wireless transmission, so that a monitor on the ground can monitor the gas concentration state at any time within the space of manhole channel for security processing to prevent from casualties of workers.

Description of the Prior Art

As to conventional cable or pipeline constructions performed inside the channels under the ground, a plurality of pipeline closure is disposed at intervals for ensuring a cable line to be mounted fixedly. The internal axial of a conventional pipeline closure is provided with a plurality of inner pipe holes. The cable line must be individually aligned with each of the inner pipe holes for penetration. However, the distance from the entrance to the mounting of the pipeline closure is long, and individual alignment is required in the process of long-distance penetration. This increases the difficulty of assembly, making it difficult to be fixed. Further, the cable line is likely to be displaced due to the traction caused by cars driven on the road.

In addition, manhole channels of electric power and telecommunications are used as places for underground cable differences continuing, connection, and accommodating, as well as placing space for cable accessory equipment such as relays, care iron, and inflatable test equipment. The manhole channels are constructed of a reinforced concrete structure, belonging to a confined construction space. After manholes are created in the underground tunnel and laying of cable lines, electricity, telecommunications personnel usually do not need to go into and out of manholes unless cable, fiber optic equipment malfunction and need repair or expansion/grafting. Since the manhole channel belongs to the underground confined space, bad ventilation may exist, and harmful gases such as carbon monoxide, hydrogen sulfide, and carbon dioxide may be produced when people entering and treading mud inside the manhole channel. Since the gases are mostly colorless and odorless, the human body may not sense them based on the sense of smell. Therefore, injuries and deaths of workers may occur frequently due to excessive inhalation of toxic gas or oxygen deficiency.

In fact, different types of mortal dangers exist in different confined space and work environments, but the highest percentage of dangers is gas hazards. According to the report and analysis on major occupational hazard inspection relevant to confined space, the number of cases about cause of death is 98% of the total amount, and the number of persons suffering disaster in a single event more than one is 60% of the total amount, wherein the types of disasters caused by gas account for about 97%.

In view of the tragedy about injuries and deaths of people working in the manhole channel due to gas poisoning time to time, after a long period of research in conjunction with improvement on the aforementioned deficiency, the present invention is eventually presented by the inventor.

SUMMARY OF THE INVENTION

Accordingly, an objective of the present invention is to provide an environmental monitoring pipeline closure and a wireless positioning and warning system thereof, which analyzes the state of hypoxia and gas hazards for the confined space of manhole channel and work environment using gas detection and alarm functions in conjunction with wireless communication for remote monitoring.

According to the environmental monitoring pipeline closure and the wireless positioning and warning system of the present invention, in which the pipeline closure mounted inside a underground manhole channel can enable a cable or a pipeline to be fixed. In addition, a gas sensing device is also provided for detecting a specific gas concentration inside the manhole channel.

According to the environmental monitoring pipeline closure and the wireless positioning and warning system of the present invention, a gas sensing device disposed on the pipeline closure, when detecting a specific gas concentration within the manhole channel exceeds the standard value, can issue a warning sound to keep on-site workers informed to evacuate while keeping the monitor on the ground informed through wireless communication to make necessary prevention. This is another objective of the present invention.

According to the environmental monitoring pipeline closure and the wireless positioning and warning system of the present invention, a monitoring device is further provided, which may be a PDA (Personal Digital Assistant) or a cellular phone, for a monitor on the ground to be kept informed of the detection result of the gas sensing device through the monitoring device. Thus is a further objective of the present invention.

The detailed structure, application principles, functions and effectiveness of the present invention will be apparent with reference to the following description in conjunction with the accompanying drawings.

DETAILED DESCRIPTION OF THE PREFERRED EMBODIMENT

Figure 1:
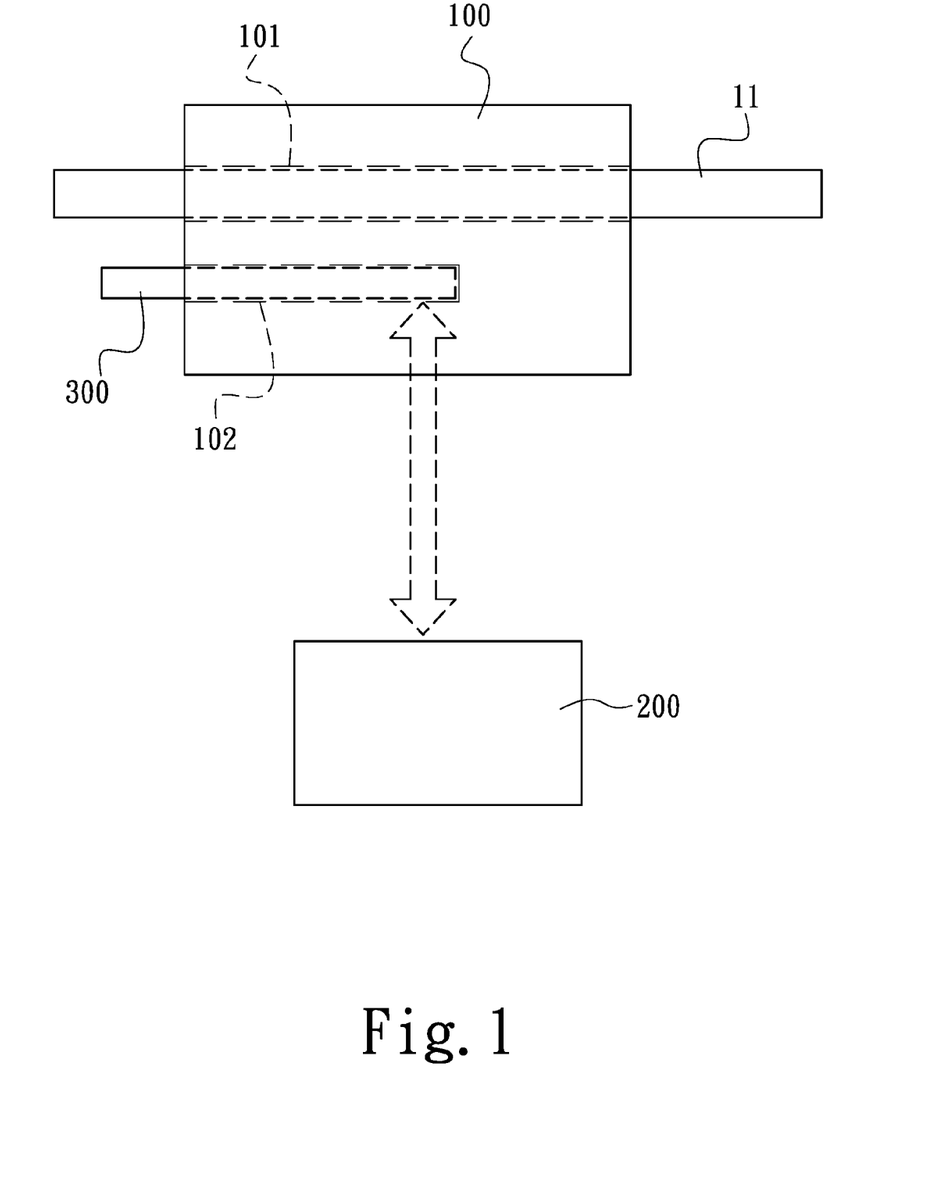
FIG. 1 is a block diagram showing an environmental monitoring pipeline closure and a wireless positioning and warning system thereof according to the present invention.

An environmental monitoring pipeline closure and a wireless positioning and warning system thereof in the present invention, as shown in FIG. 1, includes a pipeline closure 100 and a monitoring device 200; specifically, the interior of the pipeline closure 100 is provided with a plurality of clamping holes 101 and an assembly hole 102. Specifically, the clamping holes 101 allow for the passing through and fixing of a cable line 11. The internal of the assembly hole 102 is provided with a gas sensing device 300.

Figure 2:
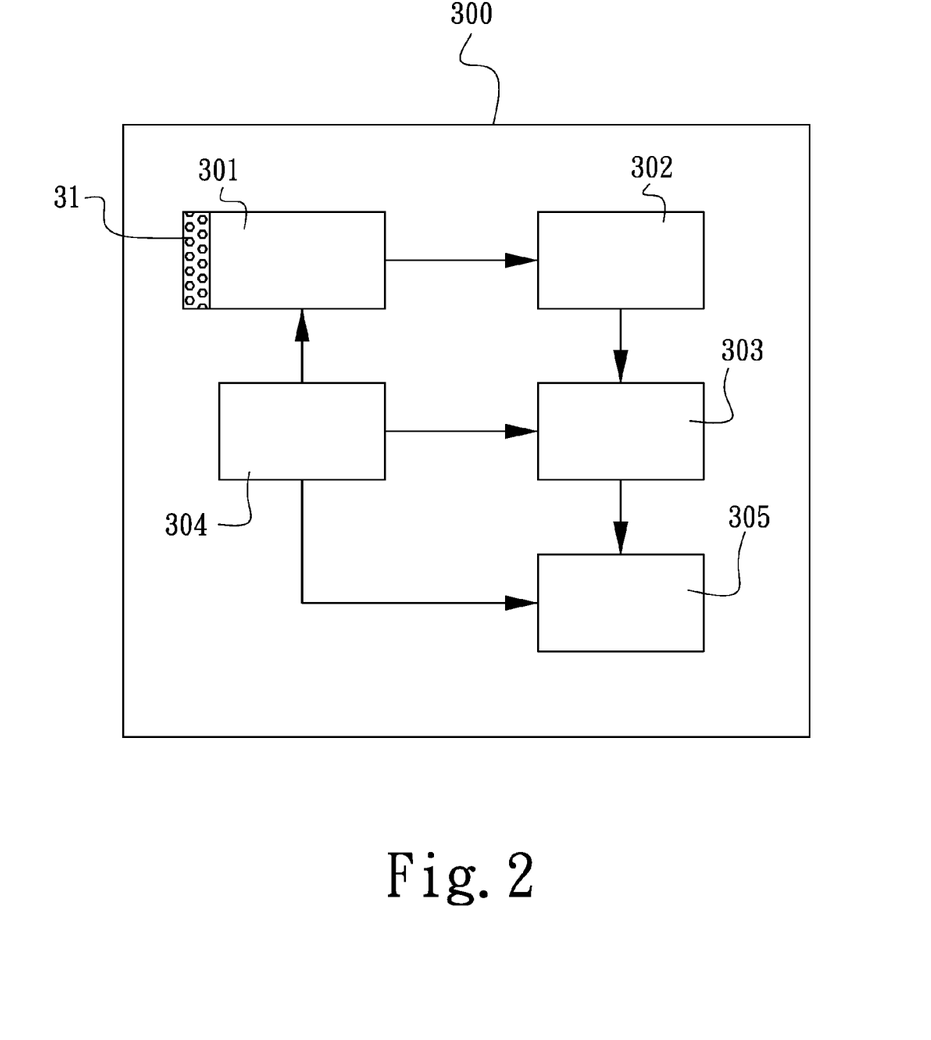
FIG. 2 is a block diagram showing a gas sensing device of the environmental monitoring pipeline closure and the wireless positioning and warning system thereof according to the present invention.

Please refer to FIG. 2. The gas sensing device 300 includes: a gas detector 301, a signal amplifier 302, a microcontroller 303, a battery module 304, and a first wireless communication module 305. Specifically, a vent hole 31 is provided on the gas detector 301 to detect gas content (e.g. oxygen) within a pipeline. The gas detector 301 may proceed with detection in a form of electrochemical, semiconductor, wafer thermal conduction and others. The battery module 304 uses mercury batteries as a power source. An external control interface of the microcontroller 303 may be provided with a plurality of key switches which can perform functions such as correction, power testing, and system reset through a microcontroller I/O port in conjunction with a control program. Moreover, the internal of the microcontroller 303 is provided with a data processing APP for processing the gas data detected.

Figure 3:
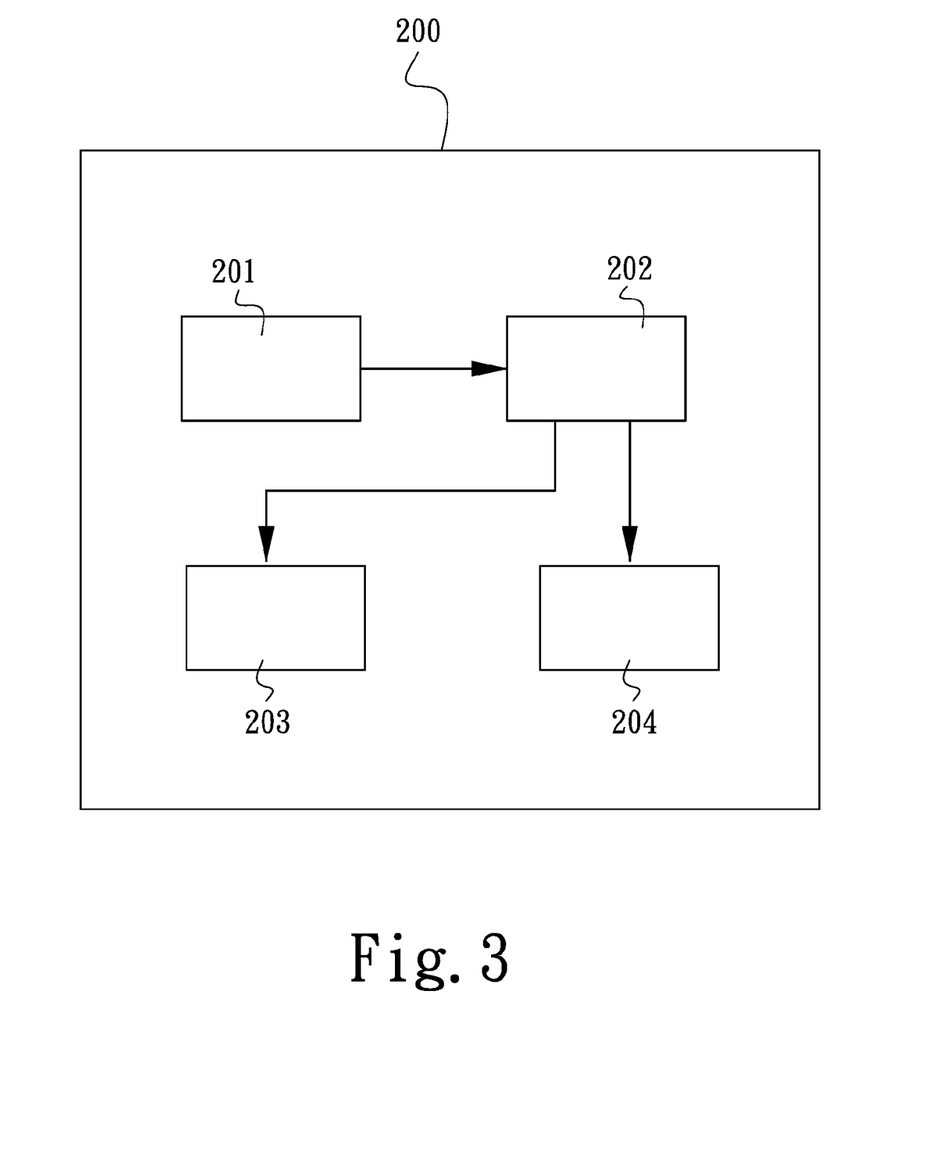
FIG. 3 is a block diagram of a monitoring device showing a gas sensing device of the environmental monitoring pipeline closure and the wireless positioning and warning system thereof according to the present invention.

As shown in FIG. 3, the monitoring device 200 is a handheld mobile device, comprising a second wireless communication module 201, a Central Processing Unit (CPU) 202, a display screen 203, and a warning device 204. Specifically, the gas data processing APP is provided in the CPU 202 to perform analysis and comparison on data detected by the gas detector 301. The transmission of the second wireless communication module 201 and first wireless communication module 305 can be transmitted can be processed through Zigbee agreements and/or wireless sensor network (WSN). The transmission manner may also be Bluetooth, ultra-wideband, 802.11 wireless network and so on.

The aforementioned second wireless communication module 201 and first wireless communication module 305 include antenna, RF signal processing circuit, baseband and logic processing circuit.

Figure 4:
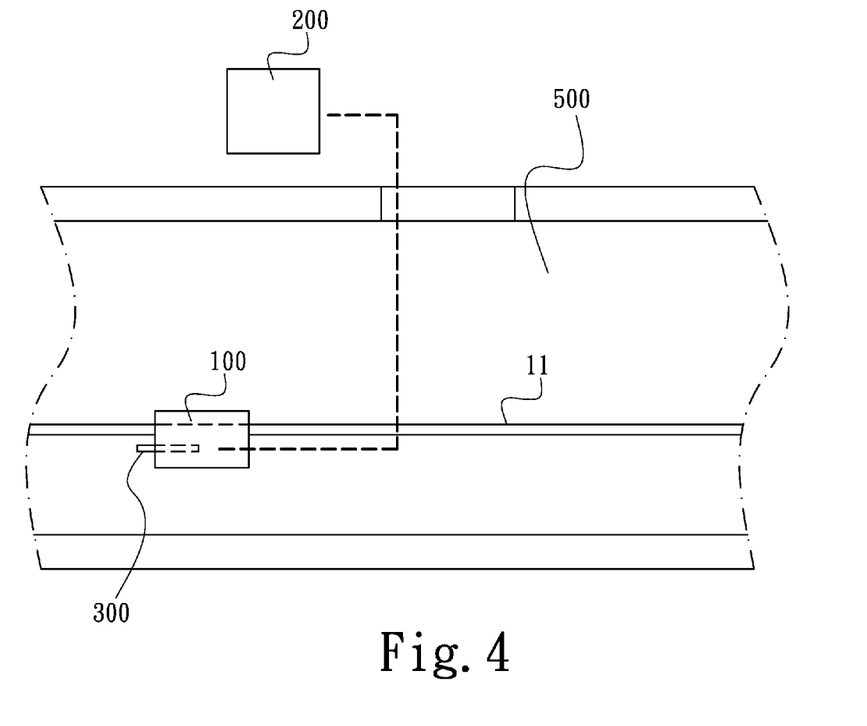
FIG. 4 is a schematic diagram showing the usage of the environmental monitoring pipeline closure and the wireless positioning and warning system on a manhole channel according to the present invention.

As shown in FIG. 4, when the pipeline closure 100 of the present invention is mounted on a manhole channel 500, the cable line can be mounted and fixed. Also, the gas sensing device 300 can be used for detecting the gas content within the manhole channel so that the workers do not need to carry heavy detection equipment to proceed with maintenance easily in the narrow space of manhole channel.

The gas detector 301 is used for detecting the gas content inside the manhole channel. The data detected by the gas detector 301 is converted to an analog signal, amplified by the signal amplifier 302, and then transmitted to the microcontroller 303 which is a 10-bit analog/digital converter with 8 channels. After the analog signal is received, digital data processing is performed and the analog signal is converted to digital data, which is then transmitted from the first wireless communication module 305, through Zigbee agreements and/or wireless sensor network (WSN), to the second wireless communication module 201 of the monitoring device 200. After that, the input digital data is analyzed and compared by a gas data processing APP of the monitoring device 200, and then displayed on the display screen 203.

When determining the detected gas oxygen content is less than the predetermined value, a warning device 204 is started to issue a warning sound or the monitoring device 200 vibrates to alert the monitor person.

Accordingly, the monitor outside the manhole channel 500 can be kept informed of the oxygen content status of the manhole channel, and promptly keep the worker in the manhole channel 500 informed to evacuate when the oxygen content is confirmed too low, which ensures the safety of workers.

Figure 5:
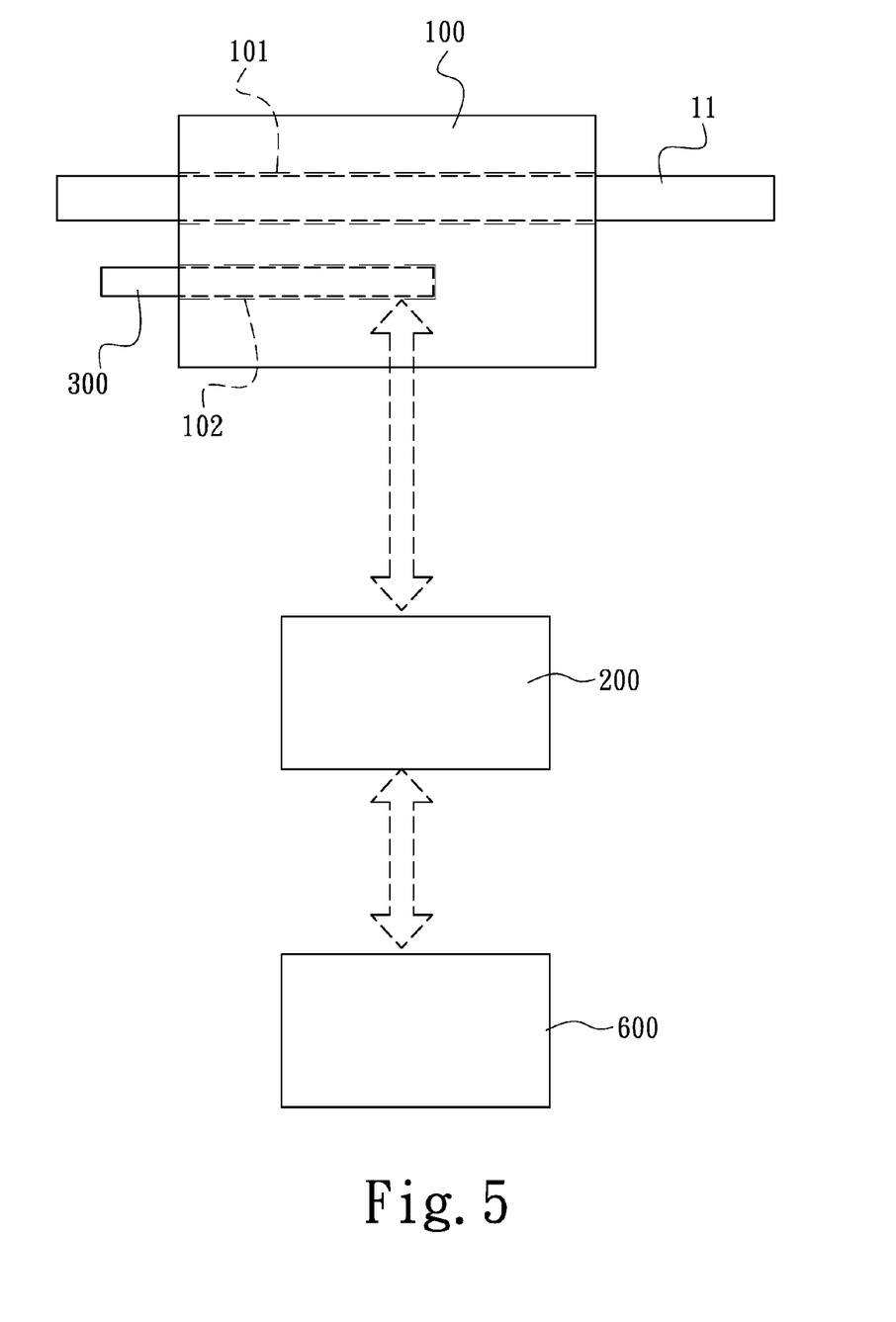
FIG. 5 is another block diagram of the environmental monitoring pipeline closure and the wireless positioning and warning system thereof according to the present invention.

Please refer to FIG. 5. When the environmental monitoring pipeline closure and the wireless positioning and warning system thereof according to the present invention is implemented, a control center 600 is also provided, the control center 600 is a PC terminal, which receives and saves digital data transmitted by a monitoring device 200 through the wireless internet TCP (Transmission Control p Protocol)/IP (Internet Protocol) so that the people in the computer PC terminal can make comprehensive reporting and treatment.

The monitoring device 200 in the present invention may be a PDA (Personal Digital Assistant), a smart phone, or a notebook computer.

Figure 6:
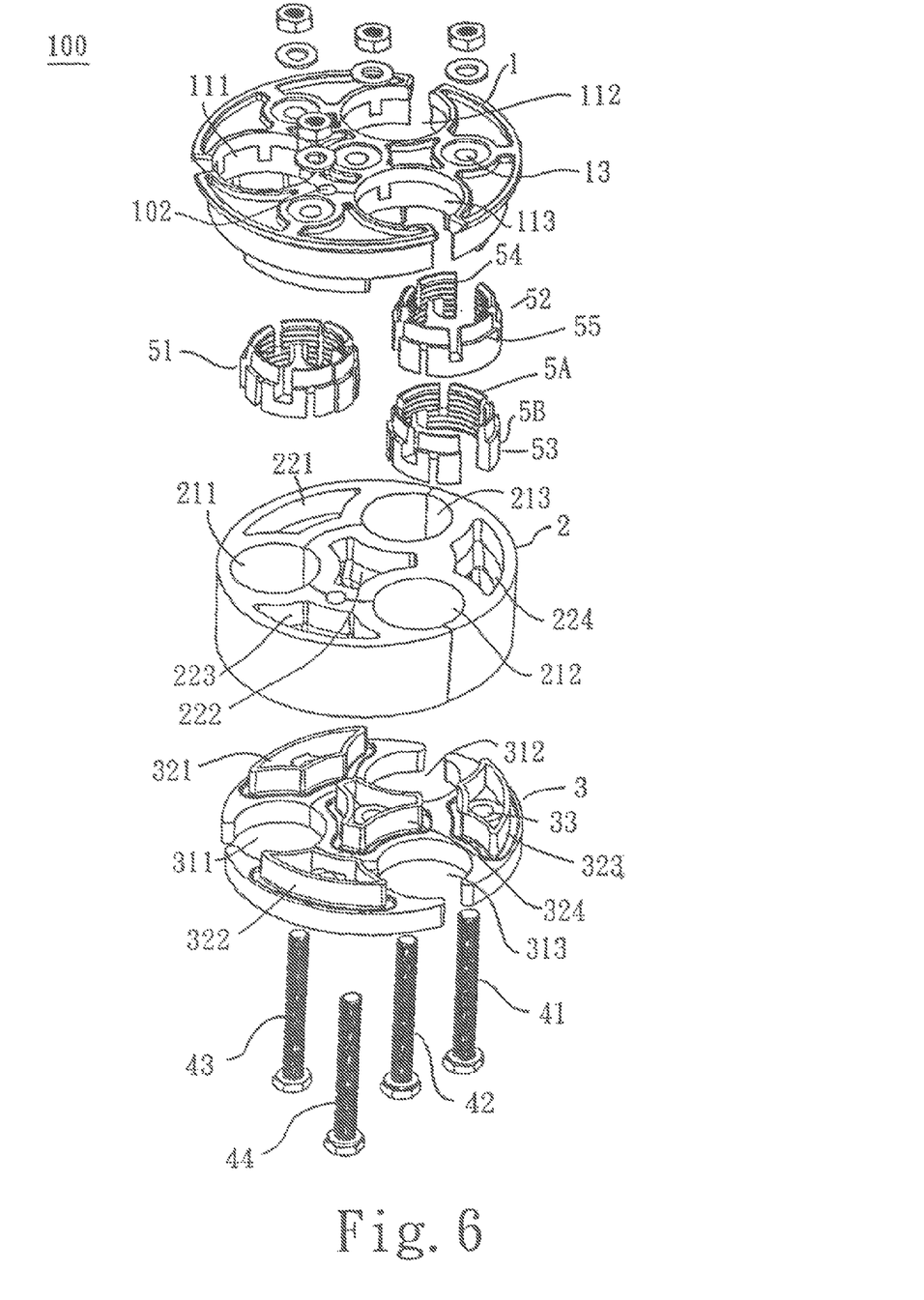
FIG. 6 is a perspective exploded view of the environmental monitoring pipeline closure according to the present invention.

Please refer to FIG. 6. The pipeline closure 100 in the present invention is composed of an upper platen 1, an expansion body 2, a lower platen 3, a plurality of bolts 41, 42, 43, 44 and a plurality of compression rings 51, 52, 53. Specifically, the upper platen 1 is provided with a plurality of through holes with notches 111, 112, 113 and a punch hole 13, as well as an assembly hole 102.

The expansion body 2 is disposed below the upper platen 1, wherein three circular through holes 211, 212, 213 and a plurality of irregular shaped sleeve holes 221, 222, 223, 224 are provided thereon; the circular through holes 211, 212, 213 are connected with the through holes with notches 111, 112, 113 of the upper platen 1; the internal of the circular through holes 211, 212, 213 may be provided with the compression rings 51, 52, 53.

The compression rings 51, 52, 53 are all a C-shaped ring body with notches, its upper end 5A is provided with a wedge 54 for increasing the tensile clamping force against the cable line, and its lower end 5B is used for being sleeved into the circular through holes 211, 212, 213 of the expansion body 2. An outer wall of the lower end 5B is provided with a stepped portion 55, by which the through holes with notches 111, 112, 113 can be sleeved and fixed into the stepped portion 55 simultaneously when the upper platen 1 is assembled to the upper end of the expansion body 2.

The surface of the lower platen 3 relative to the circular through holes 211, 212, 213 of the expansion body 2 is provided with through holes with notches 311, 312, 313; its upper end relative to irregular shaped sleeve holes 221, 222, 223, 224 of the expansion body 2 is provided with irregular shaped bumps 321, 322, 323, 324, such that the lower platen 3 can be inserted into irregular shaped sleeve holes 221, 222, 223, 224 through the irregular shaped bumps 321, 322, 323, 324 and assembled with the expansion body 2; the bottom of the irregular shaped bumps 321, 322, 323, 324 is also provided with a punch hole 33; whereby the whole body can be assembled into one when the bolts 41, 42, 43, 44 pass through each of the punch holes 13, 33, and the interlinked through holes with notches 111, 112, 113, compression rings 51, 52, 53, and through holes with notches 311, 312, 313 constitute the interlinked clamping holes for clamping the cable line.

Figure 7:
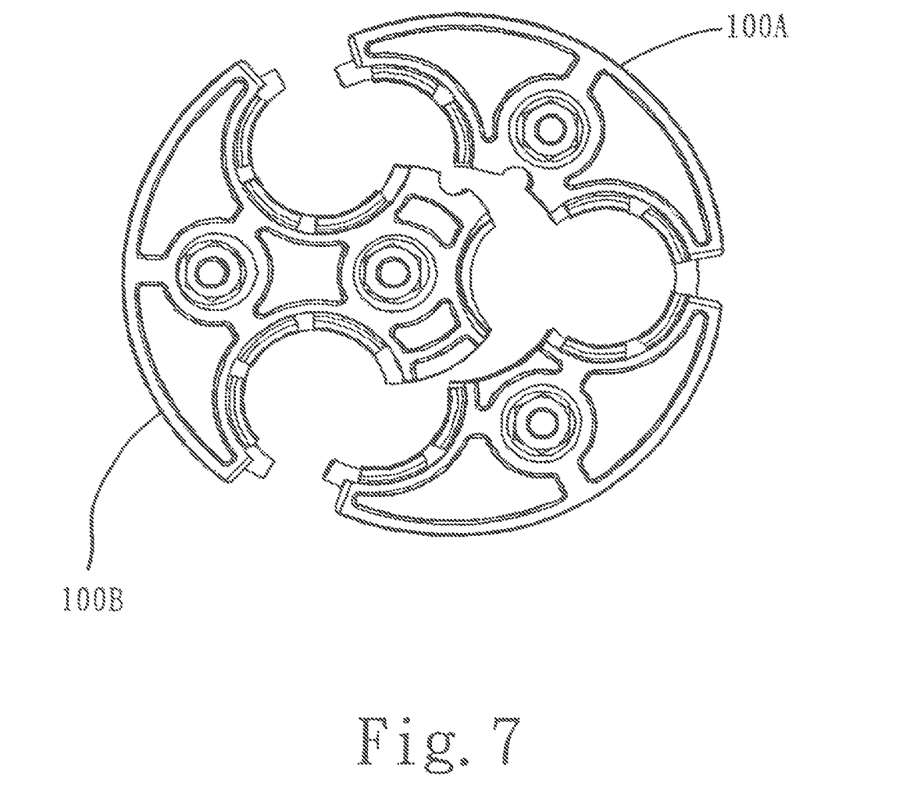
FIG. 7 is an exploded plan view of the environmental monitoring pipeline closure according to the present invention.

Please then refer to FIG. 7. In the pipeline closure 100 of the present invention, after the upper platen 1, expansion body 2, lower platen 3 and the plurality of compression rings 51, 52, 53 are engaged relative to each other, the whole body can be separated into a male plug body 100A and a female plug body 100B which not only facilitates transportation, but also enables people to quickly mount the cable line to the clamping holes of the male plug body 100A or the female plug body 100B from a lateral side. The male plug body 100A or the female plug body 100B is then assembled when the plurality of bolts 41, 42, 43, 44 pass through a punch hole, and the up/down crimping of the whole body compresses the cable line, thereby achieving really airtight, and providing advantages of easy for construction, better waterproof and pressure-resistant and not easy to produce good creeping.

When the present invention is implemented, a radio frequency identification (RFID) system can be provided on the pipeline closure 100 for quickly identifying the location. In an embodiment, the pipeline closure may be a direct reading pipeline closure whose surface color is changed when exposed to a certain amount of gas concentrations due to the selection and use of inductive materials or sensing pigments so as to provide timely protection for on-site workers.

The direct reading pipeline closure also has a high temperature color display capability, with the contact of the internal media (silica gel, alumina gel, etc.) and harmful gases, through the attached chemical substances on the internal media, a color reaction is produced so as to confirm the degree of gas contamination from the observed degree of color change of the pipeline closure. For example, when carbon dioxide is detected and carbon dioxide concentrations reach 400 mg/m3, the direct reading pipeline closure is changed from red to white so that the workers can apprehend at a glance to protect themselves promptly. Also, after the pipeline closure is mounted, it will process on-site environment detection without manual operation.

As described above, the environmental monitoring pipeline closure and the wireless positioning and warning system thereof according to the present invention can indeed detect harmful gas concentrations or oxygen timely to prevent injuries and deaths of people working inside the manhole channel. This is not disclosed and used in public, and is compliant with provisions of the Patent Law. It would be appreciated if the committee could kindly approve and grant a patent earlier for the benefit of society.

It should be noted that the described are preferred embodiments, and that changes and modifications may be made to the described embodiments without departing from the scope of the invention as disposed by the appended claims.

What is claimed is:

1. A wireless positioning and warning system of an environmental monitoring pipeline closure,
   wherein the pipeline closure is composed of an upper platen, an expansion body, and a lower platen, a plurality of clamping holes are provided in the pipeline closure for passing and fixing of a plurality of cable lines, and, a gas sensing device is provided in the main body by which gas data is detected and transmitted from a wireless communication module to a remote monitoring device for remotely monitoring the gas content in a manhole channel at any time to ensure the safety of people who work within the manhole channel, and
   wherein the gas sensing device detects gas using a gas detector, the detected gas data is converted to an analog signal, amplified by a signal amplifier, undergone analog/digital data conversion through a microcontroller, and then the digitalized data is transmitted through a first wireless communication module, through Zigbee agreements and/or a wireless sensor network (WSN), to a monitoring device, and then analyzed and compared by a gas data processing APP within the monitoring device, and the compared results are displayed or a warning sound is issued.

2. The wireless positioning and warning system of the environmental monitoring pipeline closure as claimed in claim 1, wherein the monitoring device is a PDA (Personal Digital Assistant), a smart phone, or a notebook computer.

3. The wireless positioning and warning system of the environmental monitoring pipeline closure as claimed in claim 1, wherein a control center is also provided to transfer data through TCP (Transmission control protocol)/IP (Internet protocol) with the monitoring device.

4. The wireless positioning and warning system of the environmental monitoring pipeline closure as claimed in claim 1, wherein a radio frequency identification (RFID) system is provided on the pipeline closure for quickly identifying the location.

5. A wireless positioning and warning system of an environmental monitoring pipeline closure,
   wherein the pipeline closure is composed of an upper platen, an expansion body, and a lower platen, a plurality of clamping holes are provided in the pipeline closure for passing and fixing of a plurality of cable lines, and, a gas sensing device is provided in the main body by which gas data is detected and transmitted from a wireless communication module to a remote monitoring device for remotely monitoring the gas content in a manhole channel at any time to ensure the safety of people who work within the manhole channel, and
   wherein the pipeline closure is a direct reading pipeline closure whose surface color is changed when exposed to a certain amount of the gas concentration due to the selection and use of inductive materials or sensing pigments so as to provide timely protection for on-site workers.

6. The wireless positioning and warning system of the environmental monitoring pipeline closure as claimed in claim 5, wherein the direct reading pipeline closure also has a high temperature color display function, whereby contact between internal media of the pipeline closure and harmful gases causes a color reaction to be produced on the pipeline closure due to attachment of chemical substances on the internal media.

7. The wireless positioning and warning system of the environmental monitoring pipeline closure as claimed in claim 1, wherein,
   the pipeline closure is further composed of a plurality of bolts and a plurality of compression rings,
   the upper platen is provided with a plurality of through holes with notches and punch holes, as well as an assembly hole to assemble a gas sensing device;
   the expansion body is provided below the upper platen, in which a plurality of circular through holes and sleeve holes are provided;
   the circular through holes are connected with the through holes with notches of the upper platen;
   the compression rings are C-shaped ring body with notches, on which a wedge is provided in the upper end for increasing a tensile clamping force against the cable line, the lower end being used for being sleeved into the circular through hole of the expansion body, its outer wall being provided with a stepped portion by which the through holes with notches on the upper platen are sleeved and fixed into the stepped portion of the compression rings simultaneously when the upper platen is assembled with the expansion body;

the surface of the lower platen relative to the circular through hole of the expansion body is provided with a plurality of through holes with notches;

the upper end relative to the sleeve holes of the expansion body is provided with bumps by which the upper end is inserted into the sleeve hole and assembled with the expansion body; and the internal of the bump is provided with a punch hole;

whereby the whole body is adapted to be assembled into one when the bolts pass through each of the punch holes, and the interlinked through holes with notches, compression rings, and through holes with notches constitute the interlinked clamping holes for clamping the cable line.

8. An environmental monitoring pipeline closure, which is composed of an upper platen, an expansion body, a lower platen, a plurality of bolts and a plurality of compression rings, wherein the upper platen is provided with a plurality of through holes with notches and punch holes, as well as an assembly hole to assemble a gas sensing device;

the expansion body is provided below the upper platen, and a plurality of circular through holes and sleeve holes are provided inside the expansion body; the circular through holes are connected with the through holes with notches of the upper platen;

the compression rings are C-shaped ring body with notches, on which a wedge is provided in the upper end for increasing a tensile clamping force against the cable line, the lower end being used for 10 being sleeved into the circular through hole of the expansion body, its outer wall being provided with a stepped portion by which the through holes with notches on the upper platen are sleeved and fixed into the stepped portion of the compression rings simultaneously when the upper platen is assembled with the expansion body;

the surface of the lower platen relative to the circular through hole of the expansion body is provided with a plurality of through holes with notches; the upper end relative to the sleeve holes of the expansion body is provided with bumps by which the upper end is inserted into the sleeve hole and assembled with the expansion body; the internal of the bump is provided with a punch hole;

whereby the whole body is arranged to be assembled into one when the bolts pass through each of the punch holes, and the interlinked through holes with notches, compression rings, and through holes with notches constitute the interlinked clamping holes for clamping the cable line.

9. The environmental monitoring pipeline closure as claimed in claim 8, wherein the color of the pipeline closure is changed when sensing that a specific gas concentration exceeds the standard value.

10. The wireless positioning and warning system of the environmental monitoring pipeline closure as claimed in claim 5, wherein the monitoring device is a PDA (Personal Digital Assistant), a smart phone, or a notebook computer.

11. The wireless positioning and warning system of the environmental monitoring pipeline closure as claimed in claim 5, wherein a control center is also provided to transfer data through TCP (Transmission control protocol)/IP (Internet protocol) with the monitoring device.

12. The wireless positioning and warning system of the environmental monitoring pipeline closure as claimed in claim 5, wherein a radio frequency identification (RFID) system is provided on the pipeline closure for quickly identifying the location.

\* \* \* \* \*